US010457250B2

(12) United States Patent
Espinasse et al.

(10) Patent No.: US 10,457,250 B2
(45) Date of Patent: Oct. 29, 2019

(54) MEMBER FOR A SYSTEM FOR CONNECTING A WIPER BLADE TO A WINDSCREEN WIPER ARM

(71) Applicant: Valeo Systèmes d'Essuyage, Le Mesnil Saint Denis (FR)

(72) Inventors: Philippe Espinasse, Coudes (FR); Marie-Therese Hanino, Parent (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 90 days.

(21) Appl. No.: 15/193,350

(22) Filed: Jun. 27, 2016

(65) Prior Publication Data

US 2016/0375870 A1 Dec. 29, 2016

(30) Foreign Application Priority Data

Jun. 29, 2015 (FR) ...................... 15 56019

(51) Int. Cl.
*B60S 1/40* (2006.01)
*B60S 1/38* (2006.01)

(52) U.S. Cl.
CPC ............. *B60S 1/40* (2013.01); *B60S 1/3806* (2013.01); *B60S 1/387* (2013.01); *B60S 1/3874* (2013.01); *B60S 1/3887* (2013.01); *B60S 1/4003* (2013.01); *B60S 1/407* (2013.01); *B60S 1/4048* (2013.01)

(58) Field of Classification Search
CPC .. B60S 1/4038–4048; B60S 2001/4051–4061; B60S 1/4064; B60S 1/407–4074; B60S 2001/408
See application file for complete search history.

(56) References Cited

U.S. PATENT DOCUMENTS

| 3,928,887 A | 12/1975 | Lopez et al. | |
|---|---|---|---|
| 4,354,293 A * | 10/1982 | Le Sausse | B60S 1/4003 15/250.32 |
| 2008/0092320 A1* | 4/2008 | Cempura | B60S 1/381 15/250.201 |
| 2008/0256740 A1* | 10/2008 | Moll | B60S 1/3856 15/250.201 |

(Continued)

FOREIGN PATENT DOCUMENTS

| CN | 103930317 A | 7/2014 |
|---|---|---|
| DE | 10343571 A1 | 4/2005 |

(Continued)

OTHER PUBLICATIONS

FR2846617A1 (machine translation), 2004.*

(Continued)

*Primary Examiner* — Andrew A Horton
(74) *Attorney, Agent, or Firm* — Osha Liang LLP

(57) ABSTRACT

The invention relates to a member 24 for a system for connecting a wiper blade to a windscreen wiper arm, comprising means 80 of articulation about an axis Y of pivoting and configured in order to interact with complementary means of a second member of the connection system, characterized in that the articulation means comprise at least one hole 80 comprising at least two portions 80a, 80b of a cylinder having radii $R_1$, $R_2$, which are constant and different, each cylinder forming a rotation bearing.

21 Claims, 6 Drawing Sheets

(56) References Cited

U.S. PATENT DOCUMENTS

2012/0246859 A1* 10/2012 Schaeuble ............. B60S 1/3849
15/250.32
2014/0366303 A1* 12/2014 Thebault .................. B60S 1/40
15/250.32
2015/0151718 A1* 6/2015 Moll ..................... B60S 1/4048
15/250.32

FOREIGN PATENT DOCUMENTS

| DE | 10 2004 056 835 A1 | 6/2006 | |
|----|---|---|---|
| EP | 1623898 A1 | 2/2006 | |
| EP | 2692598 A1 | 2/2014 | |
| FR | 2846617 A1 * | 5/2004 | ............... B60S 1/40 |
| FR | 2994146 A1 | 2/2014 | |
| GB | 2044082 A * | 10/1980 | ................ B60S 1/40 |

OTHER PUBLICATIONS

Preliminary Report and Written Opinion Issued in Corresponding French Application No. 1556019, dated Apr. 29, 2016 (6 Pages).
The First Office Action issued in corresponding Chinese Patent Application No. 201610822893.7, dated Apr. 23, 2018 (15 pages).

* cited by examiner

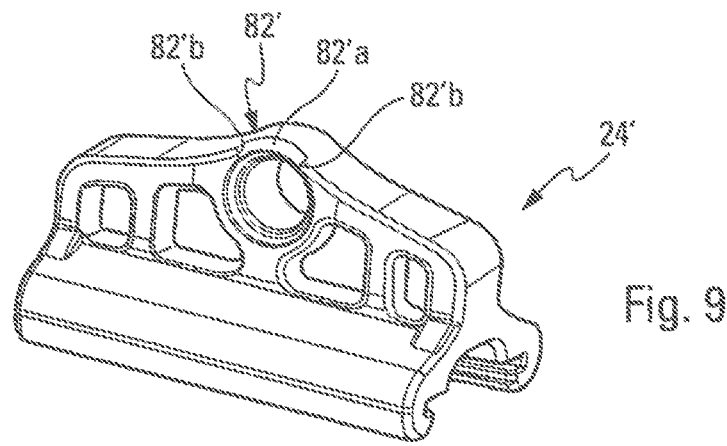
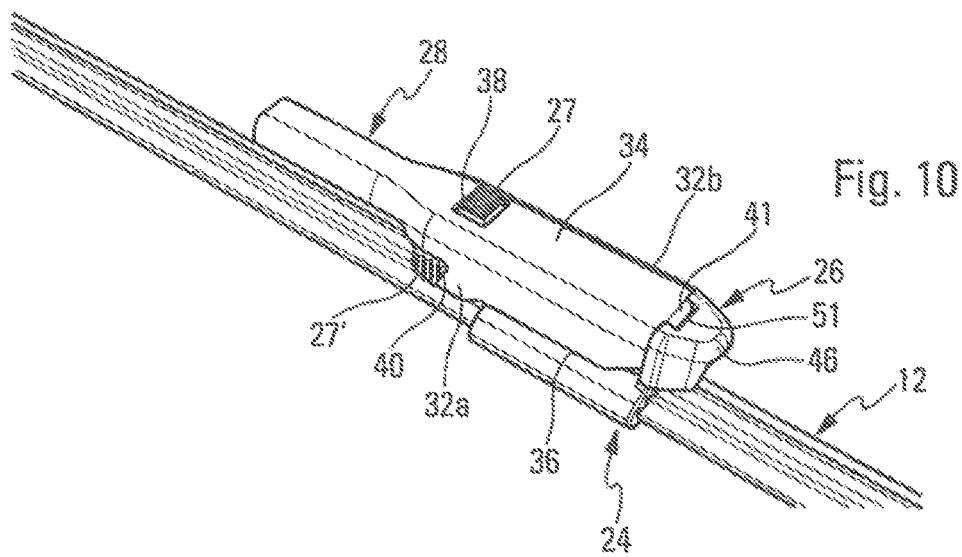
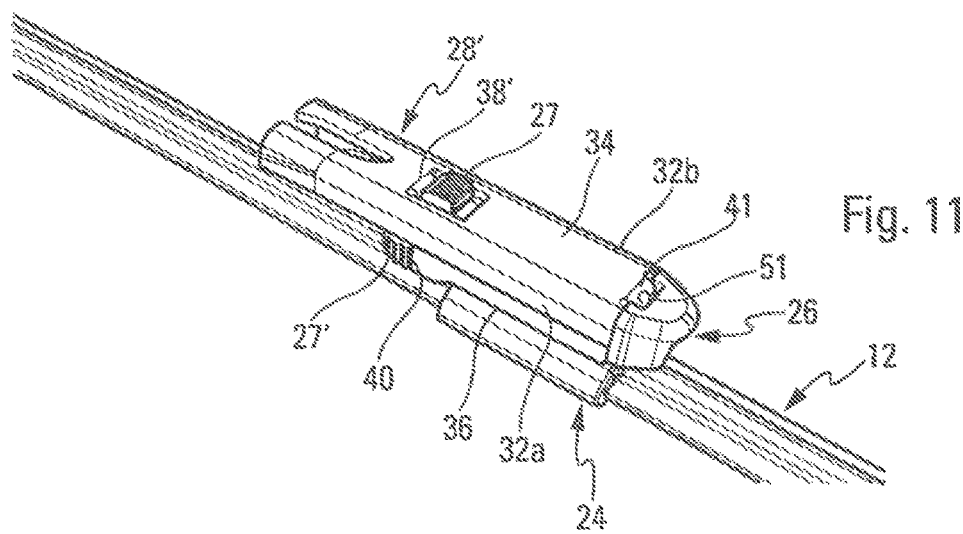

MEMBER FOR A SYSTEM FOR CONNECTING A WIPER BLADE TO A WINDSCREEN WIPER ARM

TECHNICAL FIELD

The present invention relates in particular to a member for a system for connecting a blade to a windscreen wiper arm, in particular of a motor vehicle.

PRIOR ART

A motor vehicle is conventionally equipped with windscreen wipers for washing the windscreen and avoiding disruption to the drivers view of his surroundings. These windscreen wipers generally comprise a driving arm that carries out an angular back-and-forth movement and have elongate blades which themselves carry squeegee blades made of a resilient material. These squeegee blades rub against the windscreen and evacuate the water by removing it from the drivers field of view. The blades are produced in the form either, in a conventional version, of articulated brackets which hold the squeegee blade at a number of discrete locations, giving it a bend that allows it to follow whatever curvature the windscreen may have, or, in a more recent version, known as the "flat blade" version, of a semi-rigid assembly which holds the squeegee blade along its entire length by virtue of one or more bend-forming vertebrae making it possible to press the blade against the windscreen without having to use brackets.

In both solutions, the blade is attached to the driving arm by a connection system having a connector and an adapter. The connector is a piece which is secured to the blade and which is generally fastened directly to the squeegee blade or to the flat blade, whereas the adapter is secured to the arm. The adapter is an intermediate piece which allows the connector to be linked and fastened to the driving arm. It is generally configured to be inserted into a head or terminal piece, in the form of a yoke and having a U-shaped cross section, of the driving arm.

The connector and the adapter each comprise articulation means configured in order to interact with complementary means of the other member so as to define at least one transverse pivoting axis of the connector vis-à-vis the adapter, which is a pivoting axis of the blade vis-à-vis the arm. In the current art, one of the members generally comprises a substantially cylindrical physical axis which defines the articulation axis and is received in a hole of complementary shape in the other member.

It has been observed that the connector might be made less robust owing to the presence of this hole. Indeed, this hole may traverse a part of the connector and be delimited by at least one thin wall that is relatively fragile. Wiping forces tend to give rise to significant stresses on this wall and there is a not inconsiderable risk that this wall might break during use.

The invention proposes a simple, effective and economical solution to this problem, which relates to a member of a connection system, and may, without distinction, be applied to a connector or to an adapter comprising a hole of the aforesaid type.

SUMMARY OF THE INVENTION

To that end, the invention proposes a member, called the first member, for a system for connecting a wiper blade to a windscreen wiper arm, comprising means of articulation about an axis of pivoting and configured in order to interact with complementary means of a second member of the connection system, characterised in that the articulation means comprise at least one hole comprising at least two portions of a cylinder having radii, which are constant and different, each cylinder forming a rotation bearing.

The radius under consideration is constant where its value measured in accordance with a direction perpendicular to the axis Y of pivoting is identical, moving along this as Y of pivoting. The radius of each cylinder is deemed to be different if a shoulder is visible between the two portions considered.

The member according to the invention may comprise one or more of the following features, taken individually or in combination with one another:
- the member mentioned here is a connector arranged in order to be secured with no degree of freedom on a structure of a wiper blade of the flat type,
- at least two portions are coaxial,
- the articulation means define an axis of rotation between the wiper blade and the windscreen wiper arm, the axis of rotation being, furthermore, merged with the axis of pivoting between the first member forming, for example, a connector, and the second member forming, for example, an adapter,
- the two portions are immediately adjacent,
- said hole comprises at least three portions, which are adjacent at least in pairs, and, for example, all three being adjacent, and having at least two different radii,
- the hole comprises the first portion of first radius, a third portion of third radius, and a second portion of second radius, the second radius being smaller than one of the first and/or third radii, the second portion being located between said first and third portions,
- the first portion and the third portion have an identical radius,
- the first portion and the third portion are lateral portions of said hole and the second portion is a median portion of said hole,
- the first and third portions represent end portions of said hole in accordance with the axis of pivoting,
- each of said first and third portions has a thickness measured in accordance with the axis of pivoting representing 5 to 25% of that of said hole,
- the second portion has a thickness measured in accordance with the axis of pivoting representing 50 to 90% of that of said hole,
- the ratio of the second radius to the first and/or third radius is between 0.6 and 0.9,
- said first and third portions are configured in order to receive, preferably by elastic snap-fitting, said complementary means of the second member,
- each of said first, second and third portions has a closed cylindrical surface,
- at least one of said first and third portions is connected to said second portion by an annular surface that is substantially radial relative to the axis of pivoting,
- at least one of said first and third portions forms a first rotation bearing configured in order to receive said complementary means of the second member,
- the second of the portions forms a second rotation bearing configured in order to receive a spindle of a terminal piece of an arm, said spindle extending in accordance with the axis of pivoting,
- said hole traverses a flank of said member, said flank being configured in order to be received in a housing of said second member, said flank comprises lateral notches that open out in said hole or are located in the immediate vicinity of this hole, said notches are symmetrical relative to a first median plane perpendicular to the axis of pivoting, and wherein a second plane perpendicular to said first plane passes substantially via the axis of pivoting and in the middle of said notches.

The invention also relates to a system for connecting a wiper blade to a windscreen wiper arm, this system comprising two members, one of which, called the first member, is configured in order to be secured to said wiper blade and the other, called the second member, is configured in order to be secured to said windscreen wiper arm, characterised in that the first of the members is such as defined above.

In such a case, the first member is a connector configured in order to be secured to said wiper blade.

The invention also covers a wiper blade, characterised in that it comprises or carries a first member as presented above or a system as mentioned previously.

The member according to the invention makes it possible to remedy the prior art problem of breakage of the member. Indeed, the portions of different diameters may be designed in order to limit a weakening of the part of the member comparing the hole. They further offer a plurality of possibilities for guiding and centering during articulation of the blade vis-à-vis the arm.

DESCRIPTION OF FIGURES

The invention will be better understood and further details, features and advantages of the invention will become apparent from reading the following description given by way of non-limiting example and with reference to the appended drawings, in which:

FIG. 9 is a schematic perspective view of a variant embodiment of a connector of a connection member, and FIGS. 10 to 16 are schematic perspective views of the windscreen wiper blade of FIG. 2 and of different driving arms connected to the blade by virtue of the connection system.

DETAILED DESCRIPTION

It should be noted that the figures explain the invention in detail for implementing the invention, it being, of course, possible for said figures to serve to better define the invention if necessary.

In the following description, the terms 'longitudinal' or 'lateral' refer to the orientation of the windscreen wiper blade or of the driving arm according to the invention. The longitudinal direction corresponds to the main axis of the blade or arm along which it extends, while the lateral orientations correspond to concurrent straight lines, that is to say straight lines which cross the longitudinal direction, notably perpendicular to the longitudinal axis of the blade or arm in the plane in which it rotates. For longitudinal directions, the terms 'exterior' (or 'rear') or 'interior' (or 'front') are to be viewed from the point at which the blade is fastened to the arm, the term 'interior' corresponding to the part where the arm and a half-blade extend, or from the point at which the arm is fastened to the vehicle. Finally, the directions referenced as 'upper' or 'lower' correspond to orientations perpendicular to the plane of rotation of the windscreen wiper blade, the term 'lower' containing the plane of the windscreen.

Figure 1:
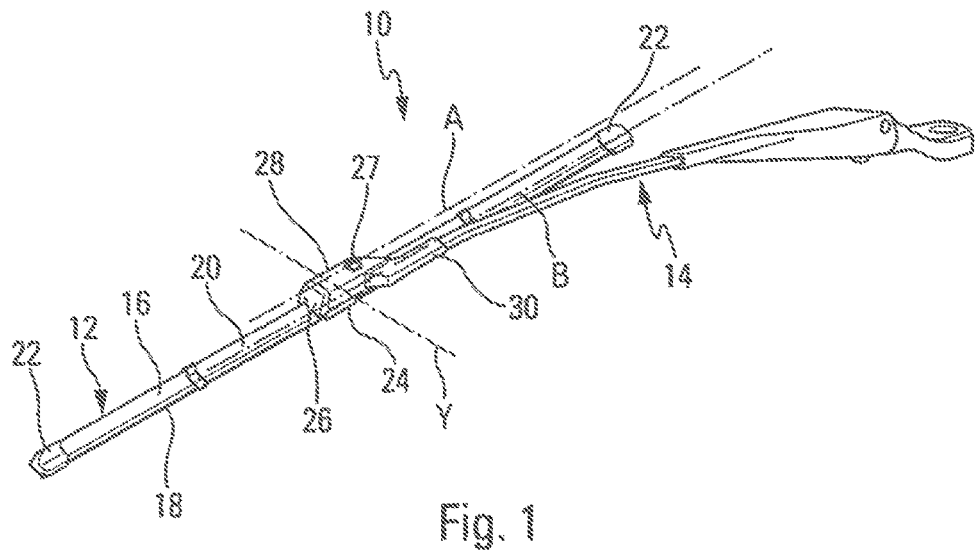
FIG. 1 is a schematic perspective view of a windscreen wiper, this windscreen wiper comprising a windscreen wiper blade and an arm for driving the blade, which are connected to one another by a connection system.

FIG. 1 illustrates a windscreen wiper 10 comprising notably a wiper blade 12 and a driving arm 14 for driving the wiper blade 12.

The wiper blade 12 is preferably of the flat-blade type and comprises a longitudinal body 16, a squeegee blade 16, generally made of rubber, and at least one vertebra (not visible) which stiffens the squeegee blade and encourages it to press against a vehicle windscreen.

The body 16 of the wiper blade 12 may comprise an upper aerodynamic deflector 20 intended to improve the operation of the wiping system, the purpose of this deflector being to improve the pressing of the wiper blade against the windscreen and therefore the aerodynamic performance of the windscreen wiper.

The wiper blade 12 may further comprise end fittings 22 or clips for attaching the squeegee blade 18 and the vertebra to the body 16, these fittings 22 being situated at each of the longitudinal ends of the body 16.

The wiper blade 12 comprises, substantially at its middle, an intermediate connector 24 otherwise called the first member. An adapter 26 otherwise called the second member, secured to the windscreen wiper arm 14 is mounted on the connector 24 so as to maintain a degree of freedom to rotate about an axis Y of pivoting which is a transverse axis substantially perpendicular to the longitudinal axis of the wiper blade 12. This degree of freedom allows the wiper blade 12 to pivot vis-à-vis the windscreen wiper arm 14 and thus allows the wiper blade to faun the curvature of the windscreen as it moves. The adapter 26 can be detached from the windscreen wiper arm 14 by pressing an actuation button, in this case a push button 27, carded by the adapter.

The windscreen wiper arm 14 is intended to be driven by a motor to follow an angular back-and-forth movement that allows water and possibly other undesirable elements with which the windscreen is covered to be evacuated. The adapter 26 provides the connection of the wiper blade 12 to the windscreen wiper arm 14 and, in particular, to a head or terminal piece 28 of the windscreen wiper arm which may be formed as one piece with the windscreen wiper arm or attached and fastened thereto.

In the example shown, the terminal piece 28 of the windscreen wiper arm forms a yoke having a transverse section substantial in the form of a U.

The terminal piece 28 has an elongate shape, the axis of elongation A of which is generally substantially parallel to the axis of elongation or longitudinal axis of the wiper blade 12. The terminal piece 28 comprises a part 30 for connecting to the rest of the windscreen wiper arm 14, for example by crimping. This part 30 has an elongate overall shape and extends along an as B substantially parallel to the axis A and spaced apart from this axis, as can be seen in FIG. 1. The part 30 is connected to a rear or interior end of the rest of the terminal piece 28.

The adapter 26 is of the 'universal' type and is designed to be mounted, without distinction, on the terminal pieces 28 of different windscreen wiper arms, even on windscreen wiper arms not equipped with terminal pieces, as will be described below in greater detail with reference to FIGS. 10 to 16.

FIGS. 2 to 9 show an embodiment of the adapter 26 and also of the connector 24 designed to interact with this adapter, the adapter and the connector together forming a system for connecting the wiper blade 12 to the windscreen wiper arm 14, or to one windscreen wiper arm 14 amongst a plurality of types of different windscreen wiper arms.

The adapter 24 has an elongate overall form along the axis A. It comprises a body having two lateral walls 42a, 42b which are substantially parallel to one another and to the axis A, and at a distance from one another. These walls. 42e, 42b are connected together at their upper ends by an upper transverse wall 44 substantially perpendicular to the wags 42a, 42b, The walls 42a, 42b, 44 here have an elongate shape in the longitudinal direction.

The was 42a, 42b, 44 of the adapter 28 between them define a longitudinal space, otherwise called a housing, 45, in which a part of the connector 24 is designed to be mounted, in particular a flank 76. The walls 42a, 42b are, here, of the double-skin type and each comprise two skins, an internal skin and an external skin, respectively, which are parallel to and at a transverse distance from one another. The skins are connected together by transverse rectilinear ribs.

The body of the adapter 28 is connected, at a first of its longitudinal ends, to a fairing or cowling, also called a cap or head 46. This head 46 has a lateral dimension greater than that of the body of the adapter and a height that is likewise greater than that of the body. The lateral walls 42a, 42b of the body of the adapter are thus set back or offset relative to external lateral faces 46a of the head, and its upper wall 44 is set back or offset relative to an external upper face 46b of the head.

The lateral faces 46a of the head 46 are connected to the lateral was 42a, 42b of the body by lateral rear faces 48a, respectively, which extend substantially perpendicularly to the axis A. The upper face 46c of the cap 46 is connected to the upper wall 44 of the body by another upper rear face 48b that also extends substantially perpendicularly to the axis A.

The rear faces 48a, 48b of the head 46 form bearing faces of the exterior or front end of the terminal piece 28. More precisely, in the mounted position of the adapter in the terminal piece 28, the front free edges of the lateral legs of the terminal piece are designed to come to bear on the faces 48a and the front free edge of the transverse wall of the terminal piece is designed to come to bear on the face 48b.

The upper wall 44 of the body of the adapter 26 comprises, substantially at its middle, a window 49. The upper wall 44 comprises, at its longitudinal end opposite the head 46, longitudinal slots that are parallel to one another and to the axis A and spaced apart from one another in such a manner as to define between them at least one portion of a longitudinal tongue 50.

The tongue 50 extends longitudinally on the side opposite the head 46, in the continuation of the upper wall 44. It is elastically deformable and is connected at its exterior or front free end to the aforementioned upper push button 27 that projects from the tongue 50. In the free state, without constraint, each tongue 50 is such that the push button 27 is located above a plane passing via the upper wall 44. Elastic deformations of the tongues occur, here, in a substantially vertical median longitudinal plane, i.e. substantially perpendicular to the upper wall 44. The adapter 26 is thus equipped with an upper push button 27.

When the adapter 26 is mounted in the terminal piece 2 the push button 27 is intended to be engaged by elastic snap-fitting in the opening 38 in order to lock the adapter vis-à-vis the terminal piece.

The adapter 26 further comprises an upper hole 51 for engagement of a tab of a windscreen wiper arm terminal piece. Here, this hole 51 is formed in part in the head 46, at the rear end thereof, and in part in the upper wall 44, at the front end thereof. The hole 51 has a square or rectangular overall shape.

The lateral walls 42a, 42b of the body extend towards the interior via elastically deformable longitudinal tabs 52a, 52b. Each wall 42a, 42b is connected to a tab 52a, 52b, these tabs 52a, 52b being substantially parallel and symmetrical relative to a substantially vertical median longitudinal plane, i.e. perpendicular to the upper wall 44 of the adapter. The free ends of the tabs 52a, 52b, which are located on the side opposite the head 46, each carry a projecting lateral push button 27'. Each tab 52a, 52b thus carries a push button 27". Elastic deformations of the tabs 52a, 52b occur, here, in a substantially horizontal longitudinal plane, i.e. substantially parallel to the upper wall 44. The tabs 52a, 52b may be brought closer together by elastic deformation. The push buttons 27" are formed in order to interact with notches of the terminal piece 28, as will be described in greater detail below.

The lateral walls 42a, 42b each comprise a through-hole 56. The holes 56 in the was 42a, 42b are substantially coaxial and, here, define the axis Y of pivoting of the adapter 24 on the connector 24 and thus of the wiper blade vis-à-vis the windscreen wiper arm. The holes 56 are, here, circular in section and each comprise a substantially cylindrical internal surface 56a. The holes 56 open at their external lateral ends on the external faces of the walls 42a, 42b, respectively, and at their internal lateral ends in the housing 45.

The internal lateral faces facing the lateral walls 42a, 42b comprise protuberances 60. Each lateral wall 42a, 42b comprises a protuberance 60, the protuberances here being opposite one another and extending substantiality towards one another. The protuberances 60 are symmetrical relative to a median longitudinal plane of the adapter, perpendicular to the upper wall 44. Each protuberance 60 also has a plane of symmetry passing via the axis Y and perpendicular to the as A.

Each protuberance 60 has an orifice and comprises a through-orifice. This orifice is, here, formed by one of the aforesaid holes 56. Each protuberance 60 is thus located on the internal face of the lateral wall 42a or 42b so as to be traversed by the hole 56 of this wall.

Each protuberance 60 has a cylindrical and, here, tubular genera/shape on account of the hole 55 traversing it. The axis of each hole 56, which is merged with the axis Y of pivoting, is likewise merged with the axis of the corresponding cylindrical protuberance 60, such that the hole is centered vis-à-vis the protuberance. Each protuberance 60 thus forms an annular bead of material around the hole 56, having, substantially, a radial thickness relative to the axis Y of pivoting that is substantially constant. Each protuberance 60 has an axial dimension along the axis Y of pivoting that represents approximately 10 to 20% of the axial dimension or width of the housing along the axis of pivoting. Each protuberance 60 has an external diameter that represents approximately 60 to 80% of the height of the corresponding lateral wall 42a, 42b, measured in a direction substantially vertical and perpendicular to the upper wall 44.

Figure 5:
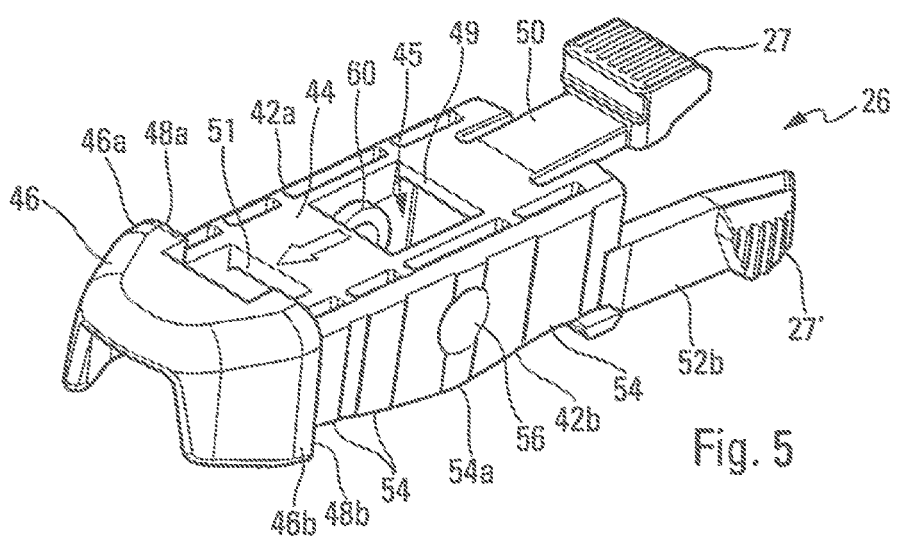
Figure 6:
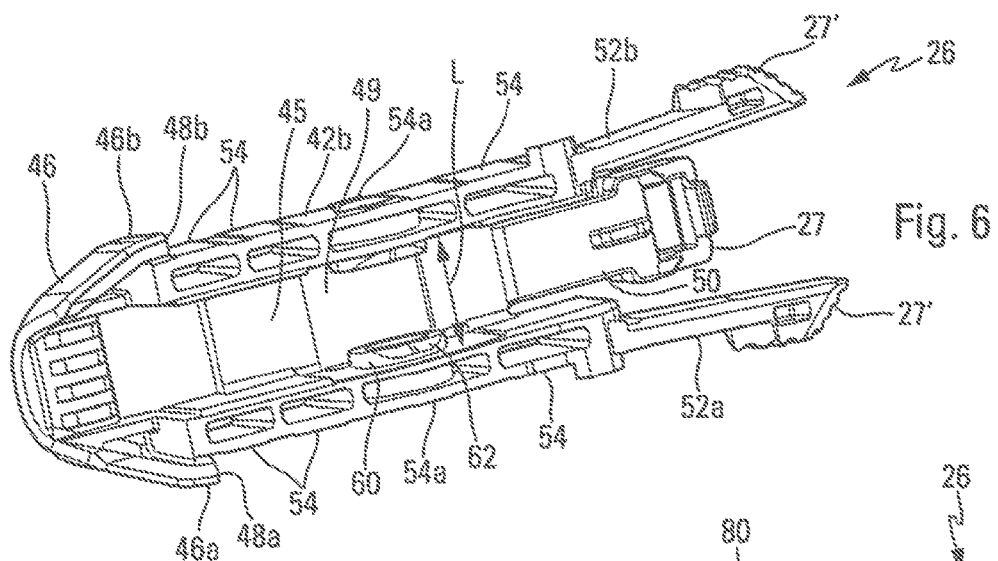

As may be seen in FIGS. 5 and 6, each protuberance 60 comprises a truncated or chamfered part, which, here, is a lower part. Each truncated or chamfered part defines a ramp 62 extending in an inclined plane relative to the lateral walls 42a, 42b. Each ramp 62 defines at least one sliding surface, and, here, two sliding surfaces, intended to interact with the connector 24. The ramps 62 of the protuberances 60 are inclined such that they diverge from one another from the top towards the bottom. Their lower ends, located on the side opposite the upper wall 44, are spaced apart from one another by a distance L along the axis V of pivoting (FIG. 6). The lower end of each ramp 60 extends at a short distance, along the axis Y of pivoting, from the internal face of the corresponding lateral wall 42a, 42b and may be directly connected to this internal face. In this latter case, the distance L is substantially equal to the distance between the internal faces of the walls 42a, 42b or to the width of the housing 45. Each ramp 62 extends over a circumference about the axis Y of pivoting, representing an angle of between 30 and 150°, and preferably between 90 and 120°.

The lateral walls 42a, 42b of the body of the adapter 26 further comprise, on their external lateral faces, projecting means 54, 54a defining bearing faces in the transverse direction. At least some 54 of these projecting means are located at the level of the holes 56 and are traversed by these holes in the example shown.

The projecting means here comprise bands 54, 54a of material projecting from the external lateral faces of the lateral walls 42a, 42b. The bands of material have an elongate form and extend longitudinally between the lower and upper longitudinal edges of the walls 42a, 42b.

The bands 54, 54a of material define bearing faces that are substantially parallel. These bearing faces are, here, substantially parallel to the external lateral faces of the was 42a, 42b and also to the longitudinal axis of the adapter 26.

The bands 54, 54a of material are spaced apart from one another in the longitudinal direction and distributed over the lateral walls 42a, 42b in the same direction. In the example shown, each lateral wall comprises four of said bands 54, 54a of material. The bands of material of one of the lateral walls are symmetrical relative to the bands of material of the other of the lateral walls, relative to a median longitudinal plane of the adapter substantially perpendicular to its upper wall 44.

The bands 54, 54a of material all have substantially the same thickness or dimension in the transverse direction. The bands 54a of material traversed by the holes 56 have a width or dimension in the longitudinal direction that is less than that of the other bands 54 of material and also less than the diameter of said holes 56.

The median transverse plane perpendicular to the upper wall 44 of the adapter 26 and passing via the axis Y of pivoting traverses the bands 54a of material substantially at their middle and is a plane of symmetry of these bands. In other words, the bands 54a of material are substantially centered on the axis Y of pivoting and the holes 56.

The adapter 26 described above is advantageously a unit, i.e. constituted by one and the same synthetic material. It may thus be manufactured in the course of a single moulding operation, particularly by means of injection-moulding.

The adapter 26 is fastened to the connector 24 by virtue of the protuberances 60 that form means for fastening the adapter to the connector and which can furthermore form means for pivoting of the adapter vis-à-vis the connector. The fastening means are of the elastic snap-fit type, the protuberances 60 of the adapter 26 being designed to interact by elastic snap-fitting with complementary means of the connector 24.

Figure 3:
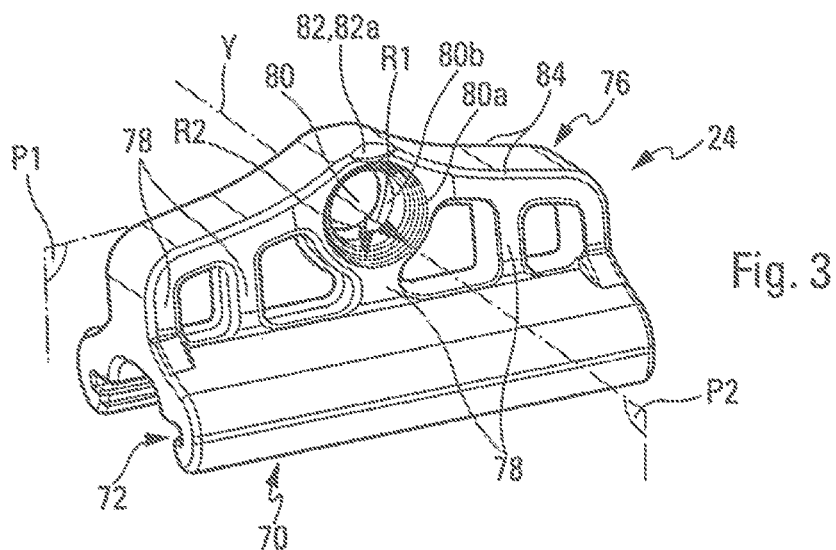
FIGS. 3 and 4 are schematic perspective views of a connector of the connection system of FIG. 2, FIGS. 5 and 6 are schematic perspective views of the adapter of the connection system of FIG. 2, FIGS. 7 and 8 are schematic perspective and sectional views of the connection system of FIG. 2.
Figure 4:
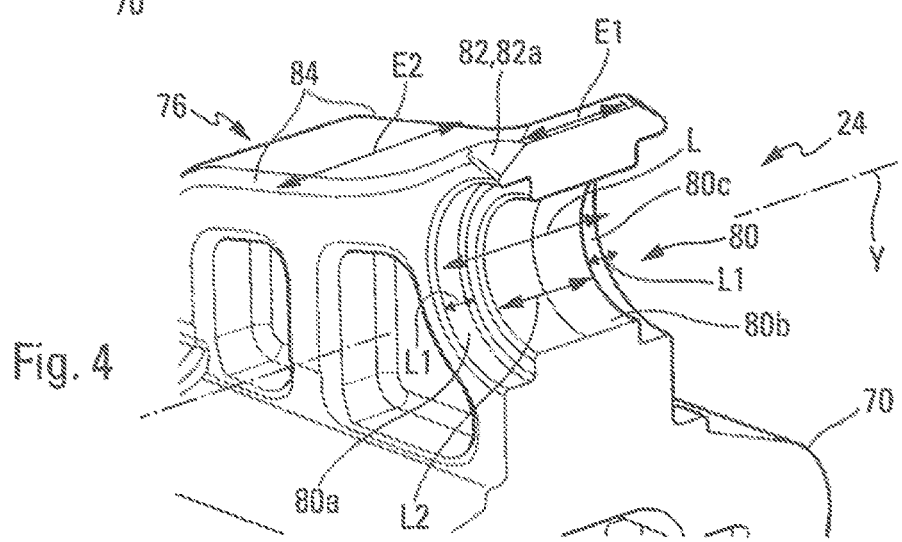

The connector 26, which can be better seen in FIGS. 3 and 4, is arranged so as to be rendered secure, for example by crimping, on the wiper blade 12. The connector 24 provides a 'complete' mechanical connection with the wiper blade 12, in the sense that there is no degree of freedom. The connector 24 may also provide a function of transporting and distributing a liquid for washing the vehicle windscreen.

The connector 24, comprises a base 70 extending longitudinally and transversely. This base 70 comprises a zone 72 of securing to the wiper blade 12 and, more particularly, to at least one vertebra 74 of this wiper blade. This zone 72 of securing has the form, for example, of a slit made in the base 70, this slit being bordered by two hooks capable of engaging on the wiper blade.

In the example shown, the wiper blade 12 comprises two parallel and coplanar vertebrae 74 spaced apart from one another in order to define a space for housing the squeegee blade 18 or the body 16 of the wiper blade. Each vertebra comprises a longitudinal edge opposite the squeegee blade 18, which is received in the slit of the connector 24.

The base 70 is surmounted by a flank 76, for example, made as one with the base. This flank 76 has a transverse dimension that is less than that of the base and a longitudinal dimension substantially equal to that of the base. The flank 76 is, for example, centered on the base 70, in accordance with the axis Y of pivoting. The flank 4 may have a plurality of ribs 78 that mechanically reinforce the flank.

The connector 24 and the adapter 26 are connected mechanically by a pivot connection. As far as the connector 24 is concerned, this pivot connection is implemented by a hole 80 made in the flank 76. This hole 80 extends in accordance with the axis Y of pivoting. It traverses the flank 76. In other words, the cavity 80 has a central axis centered on the axis Y of pivoting.

In the example shown, the hole 80 comprises adjacent portions 80a, 80b that are coaxial and of different radii. At least a first and/or third portion 80a, 80c forms a first rotation bearing facing the second member 26. It is in this way that the adapter pivots on the connector. It will be understood that only one of these portions is able to fulfil the function of first bearing, but the invention also covers the case in which the first portion 80a and the third portion 80c fulfil the function of bearing for the second member 26.

The hole 80 may comprise three distinct portions: a lateral first portion 80a, a lateral third portion 80c and a median second portion 80b extend between the first portion 80a and the third portion 80c. The lateral portions 80a and 80c have a radius $R_1$ that is greater than the radius $R_2$ of the second portion 80b.

It will be noted that the radius $R_1$ of the first portion 80a may be different from the radius $R_1$ of the third portion. This makes it possible to form a poke-yoke in order to ensure mounting of the adapter on the connector in the correct direction, since the adapter comprises protuberances having radii that are likewise different.

Alternatively, the radius $R_1$ of the first portion 80a may be identical to the radius $R_1$ of the third portion.

The radii mentioned here make it possible to understand that the first portion and/or the second portion and/or the third portion may be cylindrical angular sectors. Naturally, these angular sectors may be equal to 360° such that the first portion and/or the second portion and/or the third portion are closed cylinders of revolution.

The first portion 80a comprises a cylindrical surface ending in a first end, seen in the axis Y of pivoting and opening out on a lateral face of the flank 76. This first end of the first portion 80a is connected to this face by a convex rounded or chamfered annular edge. This cylindrical surface comprises a second end, in accordance with the axis Y of pivoting, opposite the first end, connected by a substantially radial annular surface, on the axis Y of pivoting, to a first end of the second portion 80b, seen in the axis Y of pivoting.

Similarly, the third portion 80c comprises a cylindrical surface ending in a first end, seen in the axis Y of pivoting and opening out on a lateral face of the flank 76. This first end of the third portion 80c is connected to this face by a convex rounded or chamfered annular edge. This cylindrical surface comprises a second end, in accordance with the axis Y of pivoting, opposite the first end, connected by a substantially radial annular surface, on the axis Y of pivoting, to a second end of the second portion 80b, seen in the axis Y of pivoting. The second end of the second portion 80b is opposite its first end relative to its cylindrical surface.

Each first and/or third portion 80a, 60c has a thickness L1 representing 5 to 25% of that L of the hole 80. The median portion has a thickness L2 representing 50 to 90% of that L of the hole. The ratio $R_2/R_1$ is, for example, between 0.6 and 0.9. The thicknesses L, L1 and L2 mentioned here are measured along the axis Y of pivoting.

It will be noted that at least two portions 60a, 80b are coaxial. This may, for example, be the first portion 80a that is coaxial with the second portion 80b. This may, for example, be the first portion 80a that is coaxial with the third portion 80c. This may, for example, be the second portion 80b that is coaxial with the third portion 80c. Lastly, the three portions may be coaxial.

The two portions 80a, 80b are immediately adjacent. This may, for example, be the first portion 80a and/or the third portion 80c immediately adjacent to the second portion 80b. 'Immediately' is understood to mean the portions are side-by-side, without the interposition of another element.

The connector 24 described above is advantageously a unit, i.e. constituted by one and the same synthetic material. This connector may thus be manufactured in the course of a single moulding operation, particularly by means of injection-moulding.

The adapter 26 is mounted on the connector 24 by elastic snap lifting of its protuberances 60 into the cavity 80 of the connector. The ramps 62 of the protuberances 60 of the adapter 26 interact with the connector in order to facilitate this mounting. The connector, meanwhile, also comprises means facilitating an insertion of the protuberances 60 of the adapter 26 in its cavity 10.

Here, these means are provided on the flank 76 of the connector 24. In the present case, these means are notches 82 made in the lateral faces delimiting the flank 76 and in line with which the hole 80 terminates, it will be understood, here, that each notch 82 and the hole 80 are in the vicinity of one another, the notch 82 thus extending from a ridge 84 of the flank 76 substantially as far as the hole forming the hole 80. In line with each notch 82, the flank 76 has a thickness E1 that is less than a thickness E2 of a portion of the flank 76 bordering said notch 82. These thicknesses E1, E2 are measured in accordance with a direction parallel to the axis Y of pivoting. Thus formed, this notch 82 is delimited by two guide surfaces 82a, The guide surfaces 82a of the notches 82 are substantially complementary to those of the ramps 62 of the protuberances 60 of the adapter 26.

The notches 82 are symmetrical relative to a first median plane P1 perpendicular to the axis Y of pivoting. A second plane P2 perpendicular to said first plane passes substantially via the axis Y of pivoting and in the middle of the notches.

The assembly of the adapter 26 on the connector 24 takes place solely by means of a vertical translation in accordance with an axis perpendicular to the upper wall 44 of the adapter. In the course of this translation, the protuberances 60 of the adapter 26 engage in the notches 82 of the connector and interact with their surfaces 82a in order to centre the adapter on the connector. The ramps 62 have guide surfaces that interact by sliding with these surfaces 82a. To that end, the aforesaid distance L is preferably greater than the thickness E1. Furthermore, the distance between protuberances 60, measured along the axis Y of pivoting, is less than the width of the hole 80 and also the thickness E2.

Figure 7:
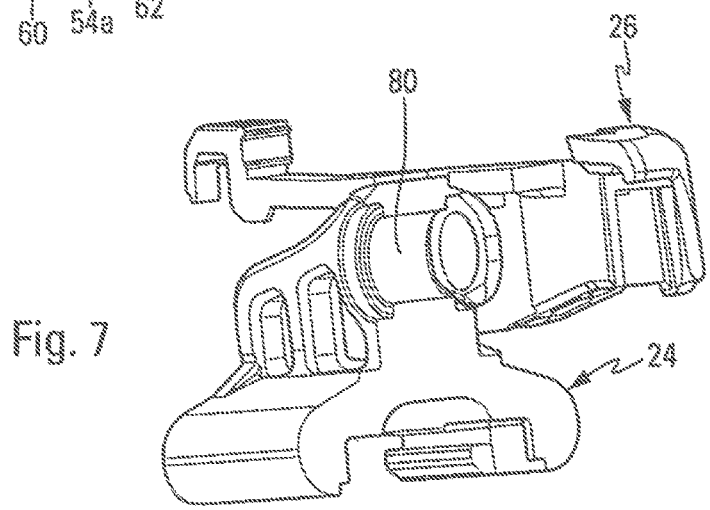
Figure 8:
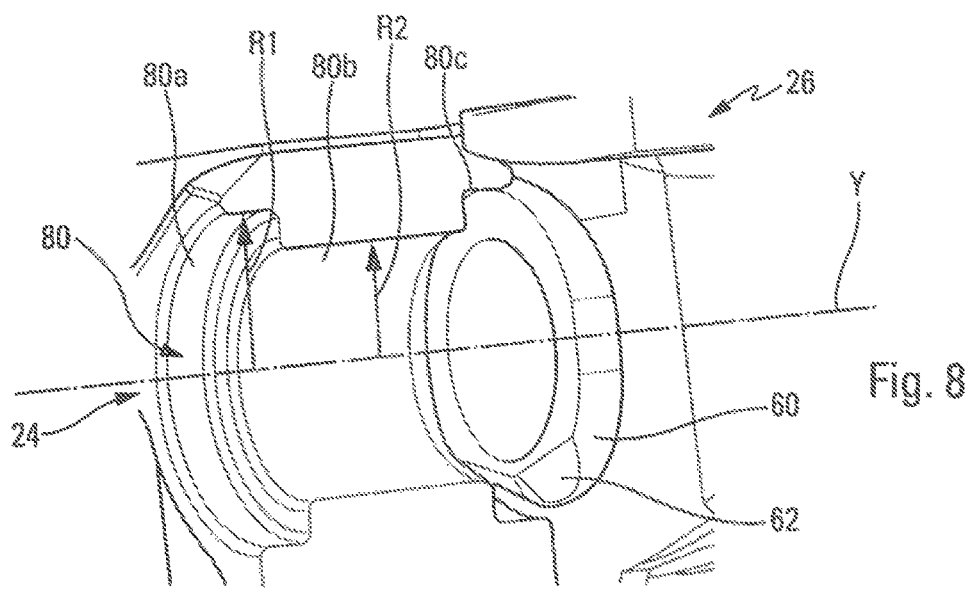

Upon insertion of the protuberances 60 into the notches 82, the ramps 62 bear on the surfaces of the notches and the downward translation of the adapter is continued such that the lateral wall 42a, 42 of the adapter are obliged to deform, with one separating from the other on account of the sliding of the ramps over the surfaces of the notches. This operation is continued until the protuberances 60 engage by elastic snap-fitting, or return in the hole 80 of the connector. The adapter is then fastened to the connector and may, furthermore, pivot on same about the axis Y of pivoting, by means of interaction of its protuberances with the cylindrical surfaces of the portions 80a of the hole 80 (FIGS. 7 and 8). The protuberances 60 may have an internal radius that is less than or equal to that $R_2$ of the second portion 80b and an external radius that is less than or equal to that $R_1$ of the first and third portions 80a, 80c.

Figure 2:
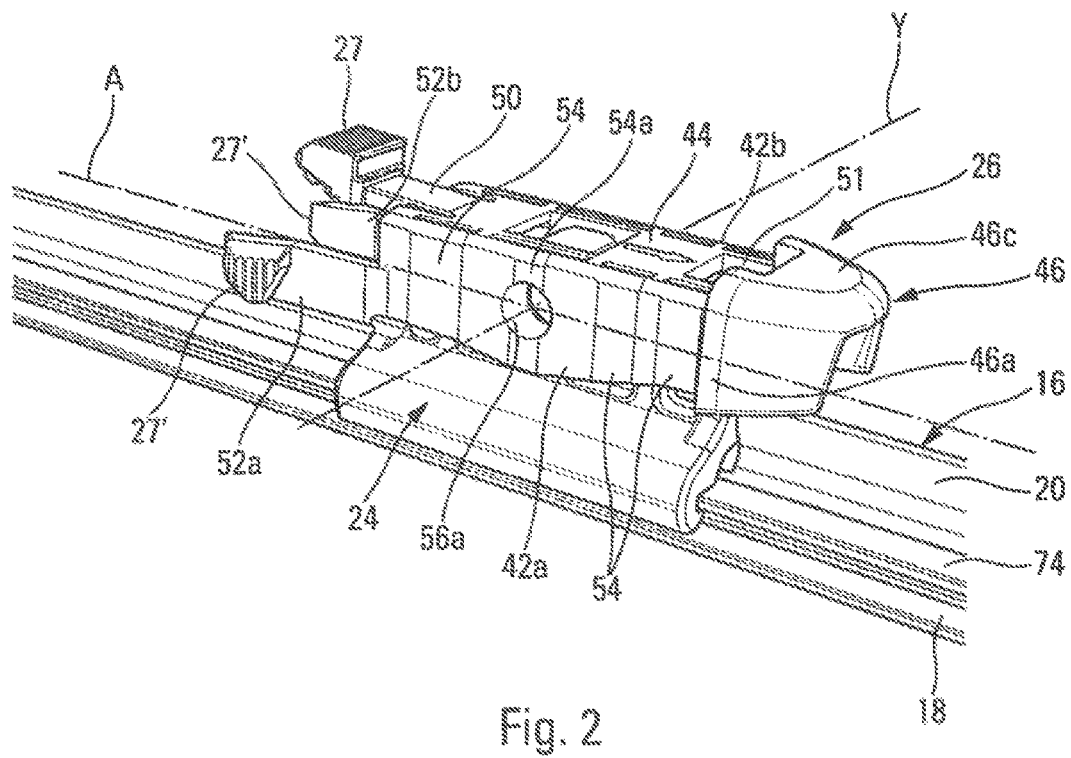
FIG. 2 is a schematic perspective view of a windscreen wiper blade equipped with a connection system according to the invention.

The mounting shown in FIG. 2 is thus obtained.

FIG. 9 shows a variant embodiment of the connector 24' that differs from that described above in terms of the form of its notches 82'.

Each notch 82' is delimited by a bottom 82a' and by two portions 82b' that connect the bottom 82a' to the corresponding lateral face of the flank of the connector. The bottoms 82' of the notches 82 are parallel or inclined relative to one another. In this latter case, they are inclined such that their upper ends, located on the side opposite the hole 80, are closer than are their lower ends. Advantageously, the protuberances of the adapter comprise chamfers formed so as to complement the notches 82'.

The adapter 26 is of the universal type since it is capable of being fastened to a plurality of types of windscreen wiper arms, be these windscreen wiper arms with a terminal piece or windscreen wiper arms without a terminal piece.

FIGS. 10 to 16 show several types of windscreen wiper arms that can be equipped with the adapter 26.

Reference is made, first, to FIGS. 10 and 11, which show, respectively, two terminal pieces 28, 28' of different driving arms.

Each terminal piece 28, 28' comprises two lateral legs 32a, 32b, the upper longitudinal edges of which are connected together by an upper transverse wall 34. Between them, the legs 32a, 32b and the wall 34 delimit a space for accommodating the adapter 26. The legs 32a, 32b may comprise, at the level of their lower longitudinal edges, means 36, such as hooks, for retention of the adapter 26 in the aforesaid space.

The upper wall 34 comprises a through-aperture 38, 38' designed to receive the upper push button 27. In the mounted position, the push button 27 is accommodated in this aperture 38 and is able to pass through the latter so as to project from the upper face of the wall 34. Mounting of the push button 27 in the aperture 36 takes place by means of simple engagement or fitting, preferably by elastic snap-fitting.

The lateral walls 32a, 32b may each comprise a notch 40 of a shape complementing a lateral push button 27'. In the mounted position, the lateral push buttons 27' are accommodated in these notches 40 and are able to traverse them so as to project from the external faces of the walls 32a, 32b. Mounting of the push buttons 27 in the notches 40 takes piece by means of simple engagement or fitting, preferably by elastic snap-fitting.

The terminal pieces 28, 28' are different. They have the same form overall but are different from one another in particular in terms of the dimensions and in terms of the shape and the size of their apertures 38, 38' or notches 40.

The upper was 34 of the terminal pieces 28, 28 continue towards the exterior in order each to form a tab 41 with a longitudinal section substantially in the form of an S, which is configured in order to be engaged in the hole 51 of the adapter 26.

The terminal pieces 28, 28' have substantially the same external width. Furthermore, the ribs 54 of the external faces of the lateral walls of the body of the adapter 26 may be spaced from one wall to the other by a transverse distance substantially equal to the internal width of the transverse piece 28, 28', such that the terminal piece is wedged in the transverse direction by means of interaction of its legs with the lateral was of the body of the adapter.

A description will now be given of the assembly of the adapter 26 on each of the terminal pieces 28, 28'.

The adapter 26 is engaged in the terminal piece 28, 28' by first inclining the longitudinal axis A of the adapter vis-à-vis that of the terminal piece 28 then engaging the tab 41 of the terminal piece in the hole 51 of the adapter. Upon this engagement, the legs of the terminal piece start by sliding on the ribs 54 of the adapter. Furthermore, the front end edge of the upper wall of the terminal piece comes to bear on the face 48b of the head 46 of the adapter. The rear end of the adapters then brought closer to the terminal piece until the lateral push buttons 27' engage by elastic snap-fitting in the notches 40 of the terminal piece 28, 28'. The front end edges of the lateral legs 32a, 32b of the terminal piece come to bear on the faces 48a of the head 46 of the adapter. The axes of the adapter and of the terminal piece 28 are thus substantially parallel.

Figure 12:
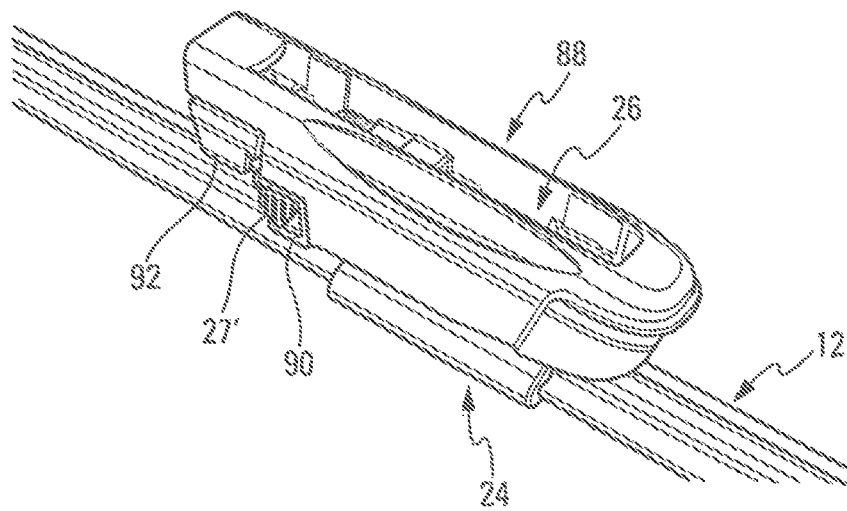
Figure 13:
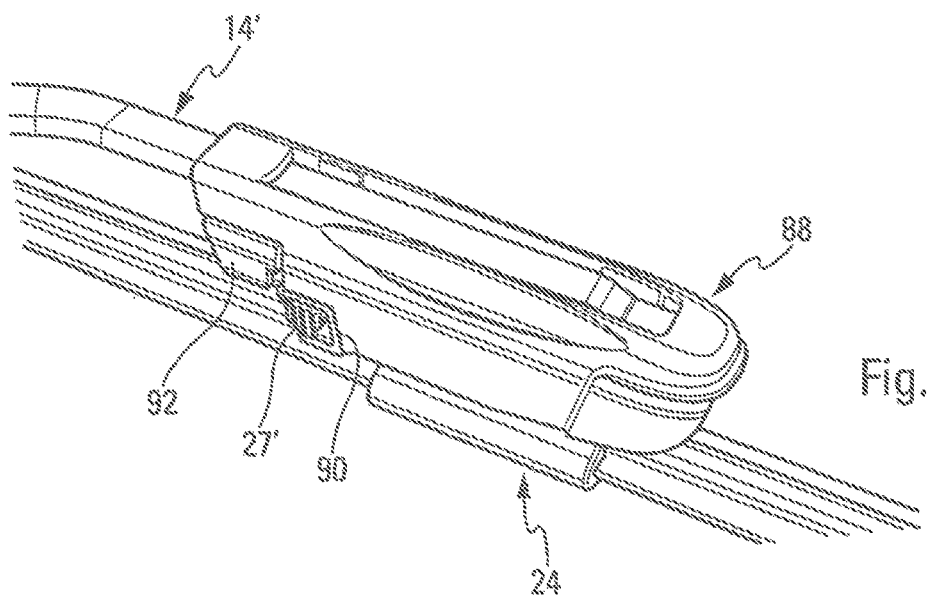

Reference is now made to FIGS. 12 and 13, in which the adapter 26 is connected to a windscreen wiper arm 14 of the rod arm type, i.e. an arm without a supplementary terminal piece, by means of a first connection member 88.

This connection member 86 is mounted on the adapter 26 and covers it fully in the example shown. It has a longitudinal form and comprises an internal housing in which the adapter is mounted and retained. At its rear end, it comprises lateral notches designed to receive the push buttons 27', respectively, by means of elastic snap-fitting.

The rod arm 14' comprises an end engaged in the connection member 88 over substantially the entire length thereof, from the rear longitudinal end of the member 88. The rod arm 14' is secured to the member 88 by appropriate means and may be detached from the member by actuation of push buttons 92 carried by the member and designed to interact with the end of the rod arm 14'.

Figure 14:
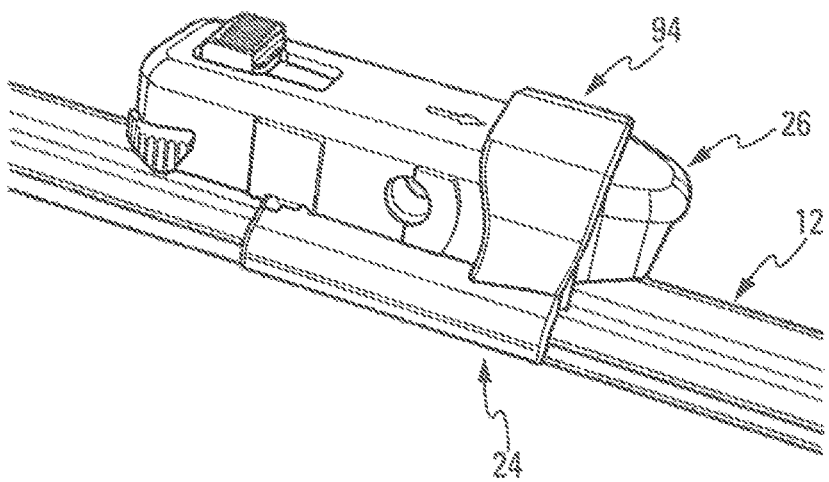
Figure 15:
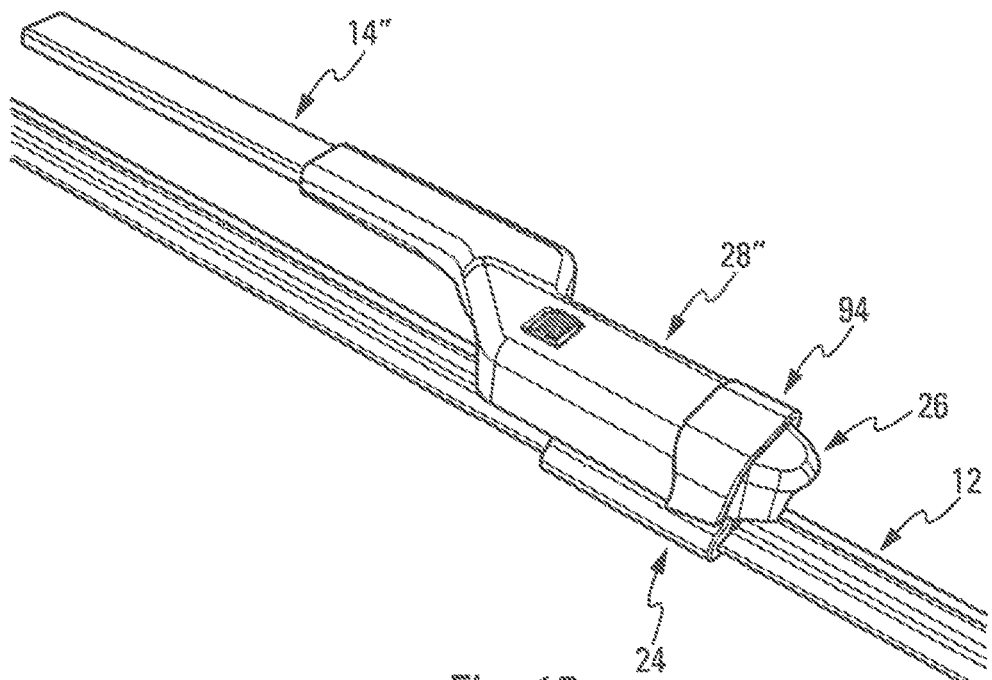
Figure 16:
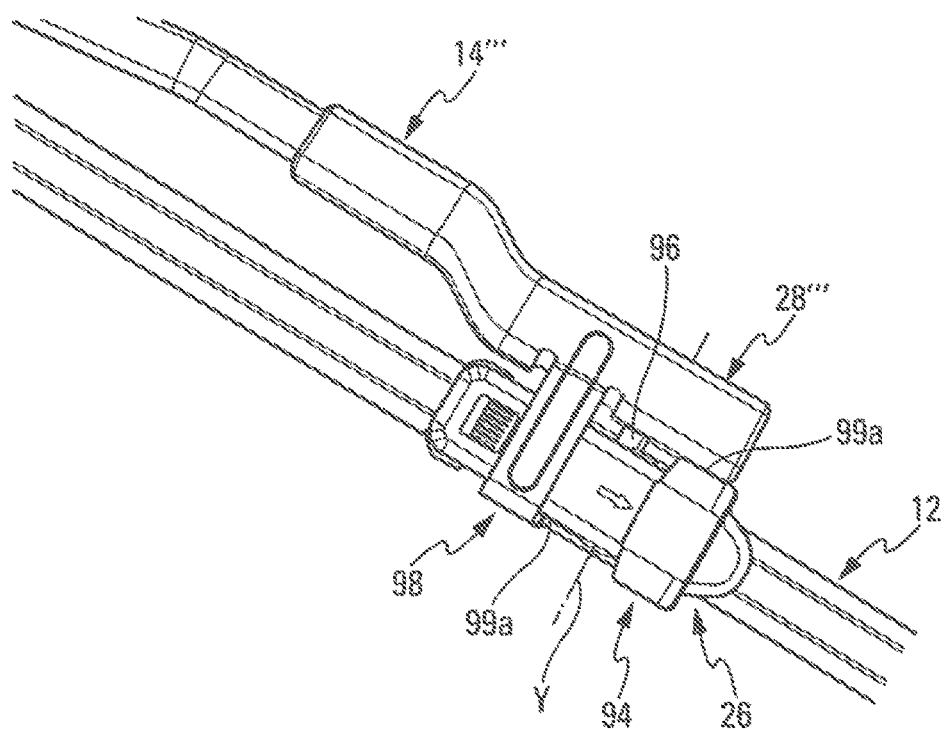

FIG. 14 shows a second connection member 94 that may be used to connect the adapter 26 to two other types of windscreen wiper arms, shown, respectively, in FIGS. 15 and 16.

The connection member 94 is similar to the adapter and is designed to be mounted on the adapter in order to cover the latter at least in part. It is, in particular, used in order to be able to equip a windscreen wiper arm 14" provided with a broad terminal piece 28" with the adapter 26. The terminal piece 28" of the windscreen wiper arm 14" in FIG. 14 differs from those of FIGS. 10 and 11 particularly in that it is broader. The connection member 94 is configured in order to take up the clearances between the adapter 26 and the terminal piece 28" and in order to match the forms of these latter, being sandwiched between them. The terminal piece 28" is similar to those of FIGS. 10 and 11.

The windscreen wiper arm 14''' of FIG. 16 is an arm with lateral locking (a side-lock arm), the terminal piece 28''' of which comprises, first, a cylindrical rod, otherwise caned a spindle 96, extending transversely on one side of the terminal piece and also an L-shaped latch 98 extending transversely on the same side as the spindle 96 and parallel to and at a distance from the latter.

The second portion 80b of the hole 80 serves, here, as rotation bearing for the spindle 96 of the side-lock arm.

The spindle 96 is designed to traverse lateral holes of the member 94 that are aligned on the axis Y of pivoting and thus aligned with the holes 56 of the adapter 28 and the hole 80 of the connector 24. The spindle 96 is engaged in these holes until its transverse piece 28''' bears on an external lateral face 99a of the member 94. The transverse piece 28''' is able to interact by sliding with the external lateral face 99a upon pivoting of the wiper blade vis-à-vis the windscreen wiper arm 14'''.

The L-latch 98 comprises a hook at its free end that is designed to interact by sliding with an opposite lateral face 99b of the member 94 upon pivoting of the wiper bade vis-à-vis the windscreen wiper arm 14''', and prevents accidental detachment of the wiper blade from the windscreen wiper arm during operation. Upon pivoting, the spindle 96 may be guided by the internal cylindrical surfaces of the protuberances 60, and even, also the internal cylindrical surface of the median part 80b of the hole.

The 'universal' adapter 26 may thus be combined with a plurality of types of driving arm.

The invention claimed is:

1. A member for a connection system for connecting a wiper blade to a windscreen wiper arm, comprising:
    articulation means about an axis of pivoting and configured to interact with complementary means protruding from a second member of the connection system, wherein the articulation means is secured to the second member by the complementary means being coaxially inserted in the articulation means,
    wherein the articulation means comprise at least one hole comprising at least two portions of a cylinder having radii, each portion having a constant radius along the axis of pivoting, and the radii of the at least two portions being different from each other, each portion forming a rotation bearing,
    wherein said at least one hole traverses a flank of said member from one side of said member to an opposite side of said member, said flank being configured to be received in a housing of said second member, and
    wherein said flank comprises lateral notches which extend from a ridge of the flank that delimit the flank and that open out in said at least one hole, wherein ramps of the complementary means bear on a surface of the lateral notches.

2. The member according to claim 1, wherein the at least two portions of the cylinder are coaxial.

3. The member according to claim 1, wherein the articulation means define an axis of rotation between the wiper blade and the windscreen wiper arm.

4. The member according to claim 1, wherein the two portions are immediately adjacent.

5. The member to claim 1, wherein said hole comprises at least three portions, which are adjacent at least in pairs and having at least two different radii.

6. The member according to claim 5, wherein the hole comprises the first portion of a first radius, a second portion of a second radius, and a third portion of a third radius, the second radius being smaller than the first and/or third radius, and the second portion being located between said first and third portions.

7. The member according to claim 6, wherein the first portion and the third portion have an identical radius.

8. The member according to claim 6, wherein the first portion and the third portion are lateral portions of said hole and the second portion is a median portion of said hole.

9. The member according to claim 6, wherein the first and third portions represent end portions of said hole in accordance with the axis of pivoting.

10. The member according to claim 6, wherein each of said first and third portions has a thickness measured in accordance with the axis of pivoting representing 5 to 25% of that of said hole.

11. The member according to claim 6, wherein the second portion has a thickness measured in accordance with the axis of pivoting representing 50 to 90% of that of said hole.

12. The member according to claim 6, wherein the ratio of the second radius to the first and/or third radius is between 0.6 and 0.9.

13. The member according to claim 6, wherein said first and third portions are configured in order to receive, by elastic snap-fitting, said complementary means of the second member.

14. The member according to claim 6, wherein each of said first, second and third portions has a closed cylindrical surface.

15. The member according to claim 6, wherein at least one of said first and third portions is connected to said second portion by an annular surface that is substantially radial relative to the axis of pivoting.

16. The member according to claim 6, wherein at least one of said first and third portions forms a first rotation bearing configured in order to receive said complementary means of the second member.

17. The member according to claim 6, wherein the second of the portions forms a second rotation bearing configured in order to receive a spindle of a terminal piece of a windscreen wiper arm, said spindle extending in accordance with the axis of pivoting.

18. The member according to claim 1, wherein said notches are symmetrical relative to a first median plane perpendicular to the axis of pivoting, and wherein a second plane perpendicular to said first plane passes substantially via the axis of pivoting and in the middle of said notches.

19. A system for connecting a wiper blade to a windscreen wiper arm, comprising:
two members, one of which is configured in order to be secured to said wiper blade and the other is configured in order to be secured to said windscreen wiper arm,
wherein a first of the members is such as defined according to claim 1.

20. The connection system according to claim 19, wherein said first member is a connector configured in order to be secured to said wiper blade.

21. A wiper blade comprising:
the member according to claim 1.

* * * * *